(12) United States Patent
Corren et al.

(10) Patent No.: US 8,303,241 B2
(45) Date of Patent: Nov. 6, 2012

(54) TURBINE YAW CONTROL

(75) Inventors: Dean Corren, Burlington, VT (US);
John Gray, Charlottesville, VA (US);
Christopher Gray, Clarkston, GA (US)

(73) Assignee: Verdant Power, Inc., Arlington, VA (US)

( * ) Notice: Subject to any disclaimer, the term of this patent is extended or adjusted under 35 U.S.C. 154(b) by 1332 days.

(21) Appl. No.: 11/979,999

(22) Filed: Nov. 13, 2007

(65) Prior Publication Data
US 2009/0123283 A1 May 14, 2009

(51) Int. Cl.
*F03B 13/12* (2006.01)

(52) U.S. Cl. ........... 415/3.1; 415/4.3; 415/906; 415/908

(58) Field of Classification Search .................... 415/3.1, 415/4.1, 4.3, 4.5, 906, 908; 416/9, 149, 153, 416/DIG. 6; 248/125.7, 130, 131, 176.1, 248/186.2, 349.1, 415, 418, 640, 660, 664
See application file for complete search history.

(56) References Cited

U.S. PATENT DOCUMENTS

| | | | | |
|---|---|---|---|---|
| 2,485,543 A | * | 10/1949 | Andreau | 60/398 |
| 2,784,556 A | * | 3/1957 | Perdue | 60/398 |
| 3,525,577 A | * | 8/1970 | Cheeseman | 416/90 R |
| 4,613,279 A | * | 9/1986 | Corren et al. | 415/121.2 |
| 4,880,193 A | * | 11/1989 | Warshawsky | 248/122.1 |
| 5,178,518 A | | 1/1993 | Carter, Sr. | |
| 6,104,097 A | * | 8/2000 | Lehoczky | 290/54 |
| 6,652,221 B1 | * | 11/2003 | Praenkel | 415/3.1 |
| 7,014,416 B2 | * | 3/2006 | Lund | 415/4.3 |
| 8,061,964 B2 | * | 11/2011 | Zuteck | 415/4.3 |
| 2001/0033790 A1 | * | 10/2001 | Hickey | 415/4.3 |
| 2006/0027400 A1 | * | 2/2006 | Garcia et al. | 175/320 |
| 2007/0041823 A1 | * | 2/2007 | Miller | 415/4.1 |

FOREIGN PATENT DOCUMENTS

GB 2 431 207 4/2007

OTHER PUBLICATIONS

International Search Report and Written Opinion from PCT Applicaton No. PCT/US2008/012731, mailed Feb. 4, 2009.

* cited by examiner

*Primary Examiner* — Edward Look
*Assistant Examiner* — Aaron R Eastman
(74) *Attorney, Agent, or Firm* — Davidson Berquist Jackson & Gowdey, LLP

(57) ABSTRACT

A KHP system turbine for the production of energy in an underwater environment including a yaw stop arrangement for use in flowing steams where the flow direction of water therein is changeable, including bi-directional and multi-directional current flows, so that a rotatably mounted turbine remains in an optimal position within such changing flow conditions. The KHP turbine includes a rotational portion and one or two passive yaw stop assemblies that will control turbine yaw and keep the turbine oriented to capture energy from changeable underwater current flows.

19 Claims, 8 Drawing Sheets

TURBINE YAW CONTROL

CROSS-REFERENCE TO CO-PENDING APPLICATIONS

The present invention is related to the following co-pending U.S. patent applications: (1) U.S. Pat. No. 4,613,279, Corren et al. entitled "Kinetic Hydro Energy Conversion System," which issued on Sep. 23, 1986; (2) United States Published Patent Application No. 2004/0070210, Johansen et al., entitled "Apparatus For Production Of Energy From Currents In Bodies Of Water, a Foundation and A Method For The Installation Of The Apparatus," published on Apr. 15, 2004; (3) U.S. patent application Ser. No. 11/514,900, filed on Sep. 5, 2006, entitled "Rotating Wedge Leveler"; (4) U.S. patent application Ser. No. 11/727,112, filed on Mar. 23, 2007, entitled "Cable Jacket Pressurization and Monitoring"; (5) U.S. patent application Ser. No. 11/429,268, filed on May 8, 2006, entitled "Single Sided Power Generating Support Frame"; (6) U.S. patent application Ser. No. 11/634,847, filed on Dec. 7, 2006, entitled "Blade Tip . . . "; and (7) U.S. patent application Ser. No. 11/400,281, filed on Apr. 10, 2006, entitled "Kinetic Hydropower From Slow Moving Waters", each of which is hereby incorporated herein its entirety by reference thereto.

COPYRIGHT NOTICE

A portion of the disclosure of this patent document contains material which is subject to copyright or mask work protection. The copyright or mask work owner has no objection to the facsimile reproduction by any one of the patent document or the patent disclosure, as it appears in the Patent and Trademark Office patent file or records, but otherwise reserves all copyright or mask work rights whatsoever.

FIELD OF THE DISCLOSURE

This relates to Kinetic Hydro Power (KHP) system turbines. In particular, this relates to improved axial-flow turbines and mounting assemblies therefor that permit such KHP turbines to be oriented in the best way possible to capture energy where there are ever present, bidirectional and multi-directional underwater current flow changes. The structure of the turbine and the mounting technique permits the turbine to yaw about a vertical axis in a controlled manner so that the rotor is always in, or approximately in, substantially the same flow pattern and oriented downstream, regardless of current flow directional changes. By permitting controlled rotation of under water turbines such turbines can follow current flow directional changes to optimize the position the turbine relative to such changes and thereby achieve the best turbine orientation for power generation.

INTRODUCTION

Glossary: As used throughout this document:

The phrase "yaw stop" shall mean any device, arrangement or assembly that will stop or limit the rotational movement around a vertical axis of a rotating pylon forming part of an under water turbine.

The terms "yaw stop exclusion angle" and "yaw stop error angle" refer to the amount of angular offset at which an under water turbine is oriented.

DESCRIPTION OF PRESENTLY PREFERRED EXAMPLES AND EMBODIMENTS OF THE INVENTION

Brief Description of Figures

The invention is better understood by reading the following detailed description with reference to the accompanying drawings in which.

Figure 6:
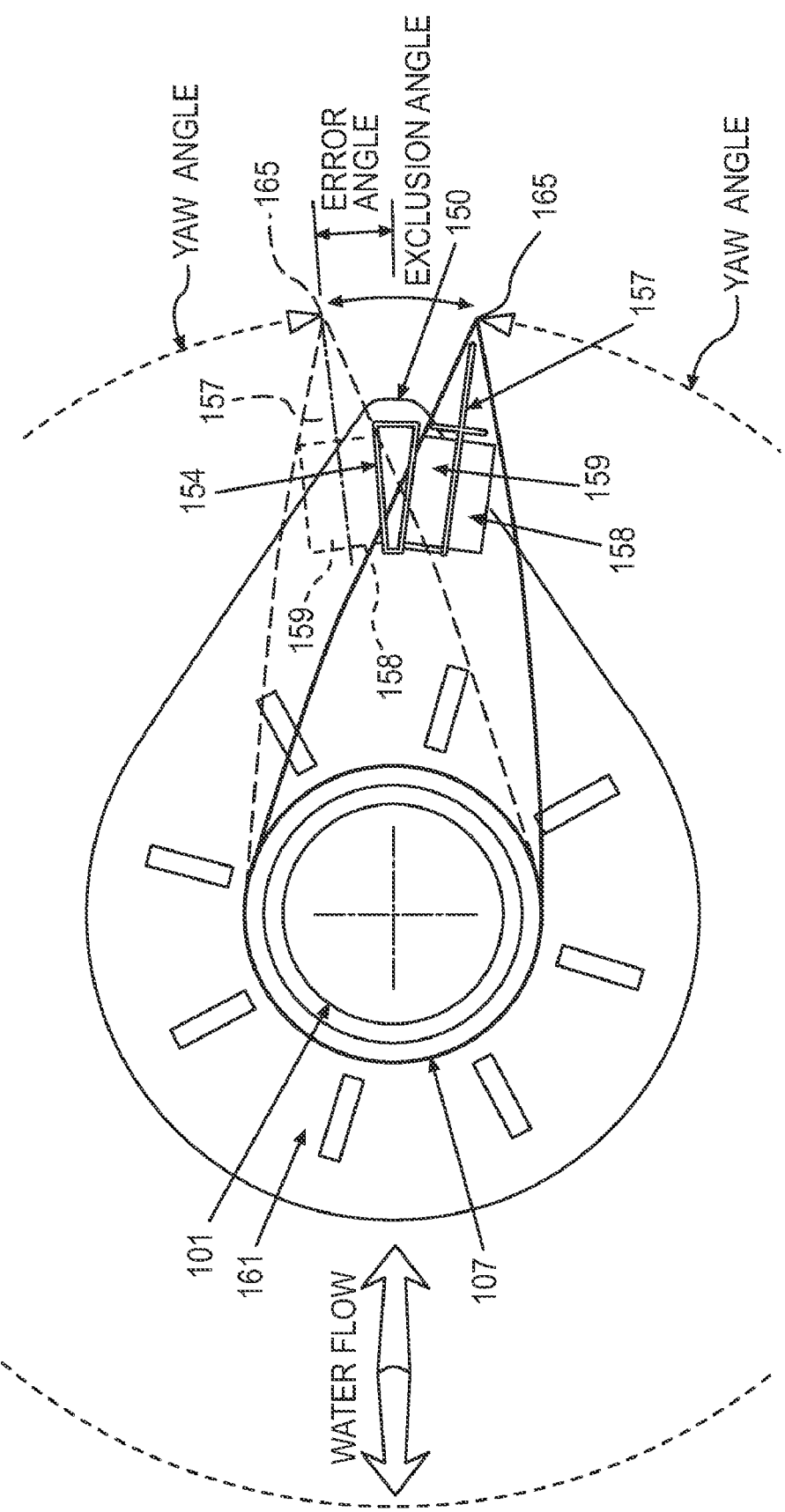
Figure 7:
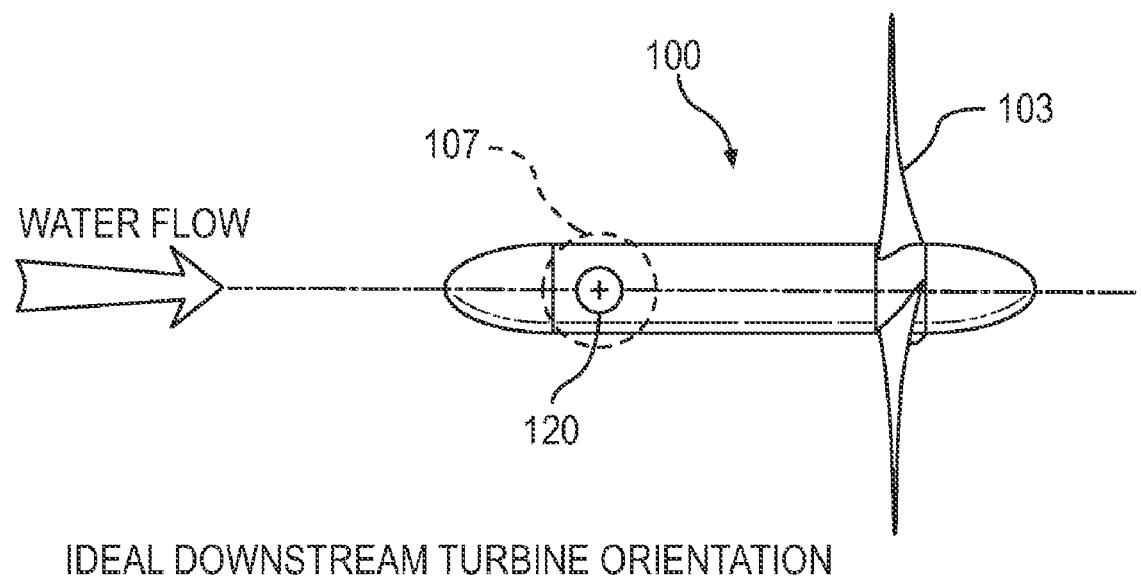

orientation;

FIG. 6 is a plan view through the pylon showing a single yaw stop configuration;

FIG. 7 is a representation of the ideal downstream turbine

Figure 8:
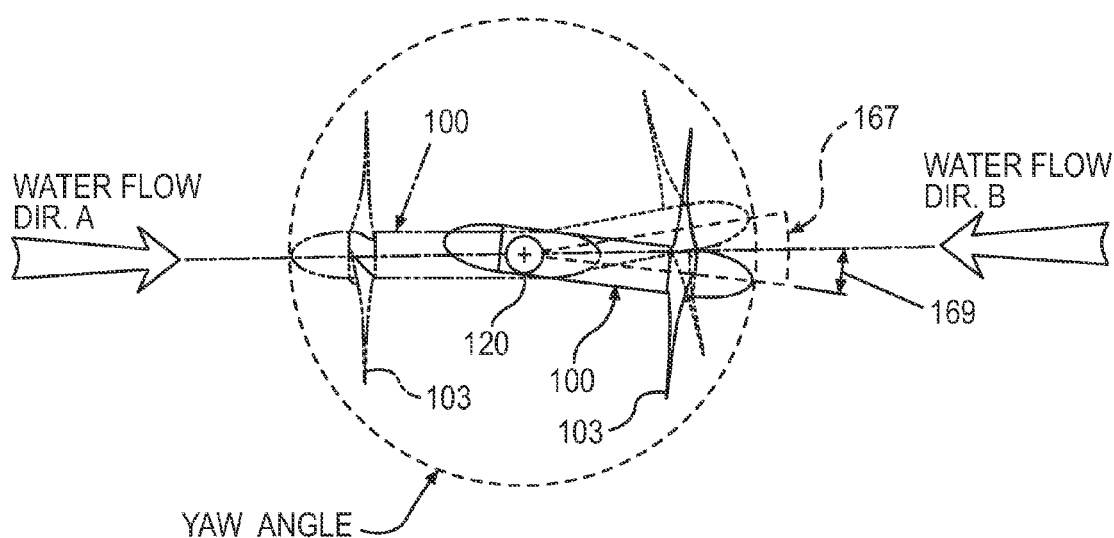
Figure 9:
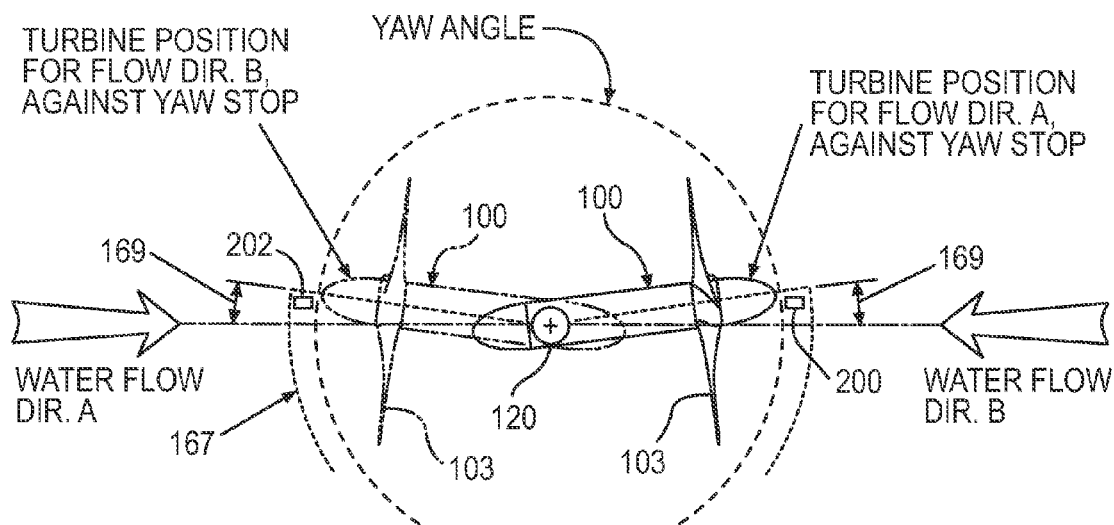

FIG. 8 is a plan view showing schematic operation of the single yaw stop configuration; and FIG. 9 is a plan view showing two stopped positions for a double yaw stop embodiment.

DETAILED DESCRIPTION

A typical KHP turbine system is described in U.S. Pat. No. 4,613,279, the entire contents of which are incorporated herein by reference. Typical KHP turbine systems employ one or more turbines anchored to a base positioned within flowing water, for example a river bottom, each of which include an external rotor that rotates in response to water flowing there past via a rotating shaft that is sealed where it passes into the nacelle or body of the turbine. The nacelle, desirably, is a watertight enclosure that supports a rotor and which can house machinery comprising various electrical and mechanical components. However, where sealed components are used within the nacelle then it would not be necessary to have the nacelle be a watertight compartment or that the shaft be sealed. Rotation of the rotor causes the electrical and mechanical components to generate power and suitable cable connections are provided so that electrical control or data signals can be sent between the turbine and a ground station and so that generated power can be transmitted from the turbine onto a power grid or otherwise used on shore.

Figure 1:
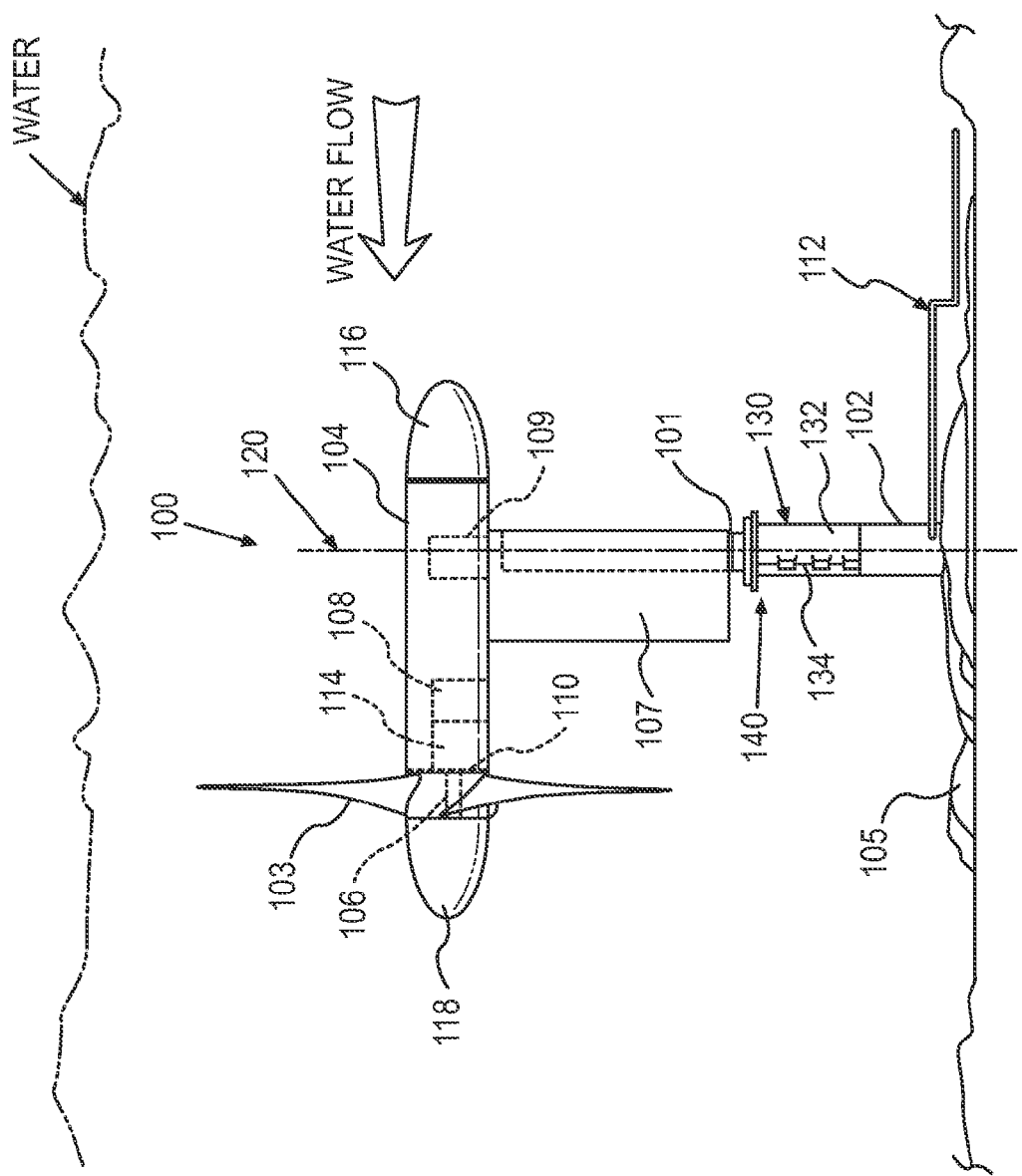
FIG. 1 is a front elevational view of an under water turbine.

In order for any KHP turbine, for example as is shown at 100 in FIG. 1, to be most useful and to produce power most efficiently, it is important that the turbine, the nacelle and the supporting pylon be properly oriented in the flowing water or fluid stream. It is preferred that the primary mounting mechanism for turbine 100 be level so that a yaw axis 120 of the turbine 100, which extends through the inner pylon 101, be vertical even though supported by a mounting structure installed on the bottom of the water channel, stream, river or otherwise, that is not itself level. That mounting technique is described in the Rotating Wedge Leveler application identified above and which is fully incorporated herein by reference.

FIG. 1 shows an exemplary embodiment of a KHP system turbine 100 mounted in flowing water, for example, to the bottom of a river 105 by a pile or monopile 102. The turbine could be held in place by gravity or other mounting technique. All that is necessary is that the turbine be mounted or otherwise supported so that it will be stable and able to operate within the flow conditions where it is situated. The turbine 100 comprises several main portions including a rotor 103, a nacelle 104, to which the rotating rotor is rotatably attached, and inner and outer pylons 101 and 107, respectively, a nose cone 116 and a rotor cone 118. The nacelle 104 is preferably attached to the outer pylon 107 and both rotate relative to the inner pylon 101 as will be more fully described below.

Figure 2:
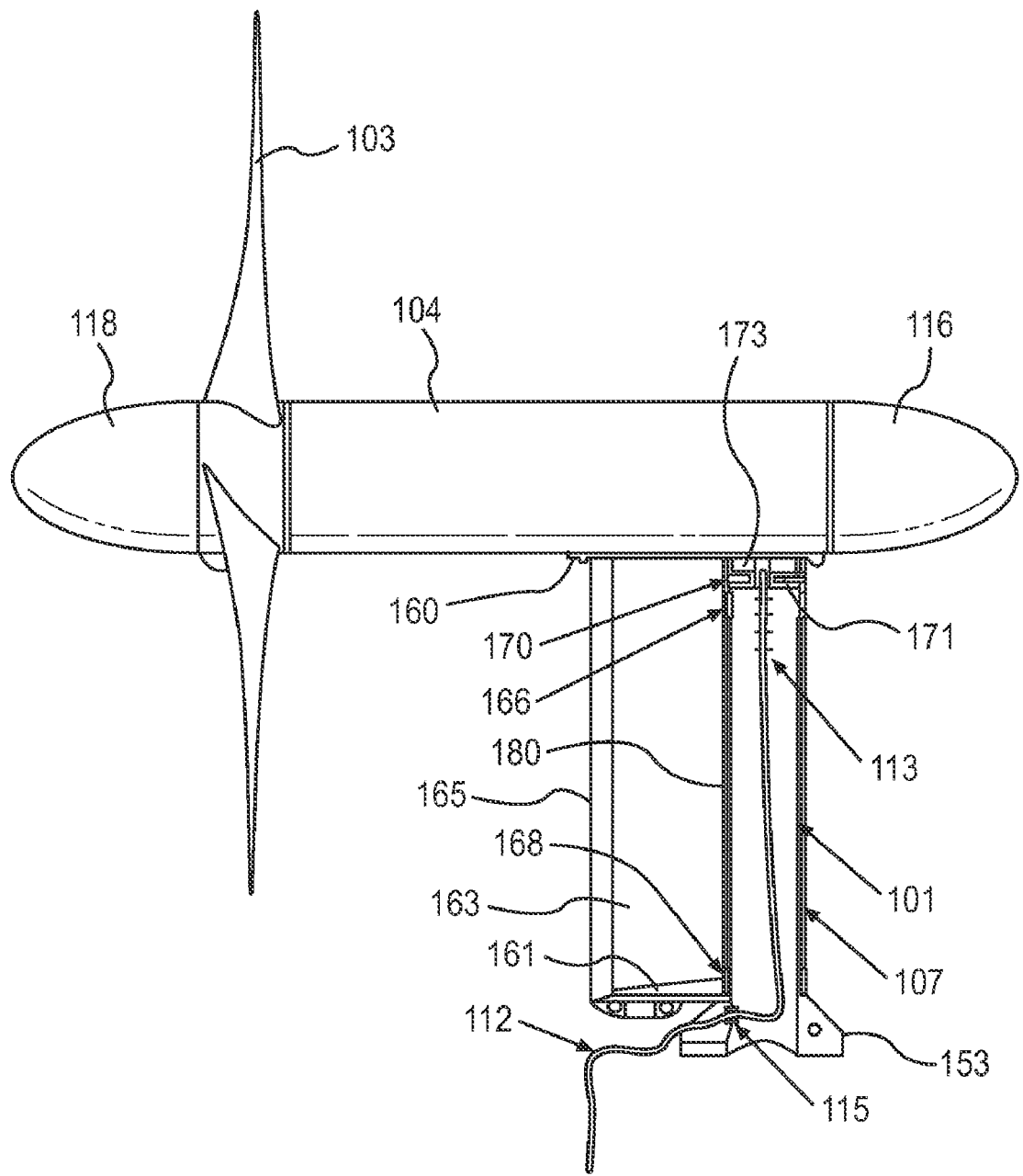
FIG. 2 is an elevational view of a turbine with a portion of the pylon cut away and shown in cross section

FIGS. 1 and 2 show that the inner pylon 101 includes a main mounting plate 153 that can be attached, for example, to pile 102 by a clamp assembly 130 and a mounting and leveling assembly 140. These two assemblies assure the outer pylon and nacelle 104 are able to rotate about a stable, vertically oriented yaw axis 120, and is described in the above referenced Rotating Wedge Leveler application, which is hereby incorporated herein in its entirety by reference thereto. The mounting and leveling assembly 140 permits a range of mounting angles to be created by relative movement between the parts of the mounting assembly 140 to counteract any reasonable amount of tilt angle errors that may arise during or as a result of the installation of the pile 102 away from a precisely plumb vertical condition. This ability to create tilt error correction mounting angles assures that the turbine's yaw axis about the axis of the inner pylon 101 is close to a perfectly vertical condition following mounting. Relative rotation between the inner pylon 101 and outer pylon 107 allows rotor 103 to almost always be in an optimal orientation for generating power within the flow of the water, regardless of changes in the direction of that water flow and the force of such flows. For example, in a tidal environment nacelle 104 and rotor 103 will be able to face one direction when the tide is flowing one way yet rotate into another position as tidal changes occur. Current flow direction is shown in FIG. 1 by arrow "A" for the water.

The nacelle 104 encloses suitable power generating components including, for example, a gearbox 114 and a generator 108. Furthermore, the nacelle may house other various electronic controls and/or monitoring components 109 such as, for example, for monitoring various temperatures, or other operating or performance parameters.

Figure 3:
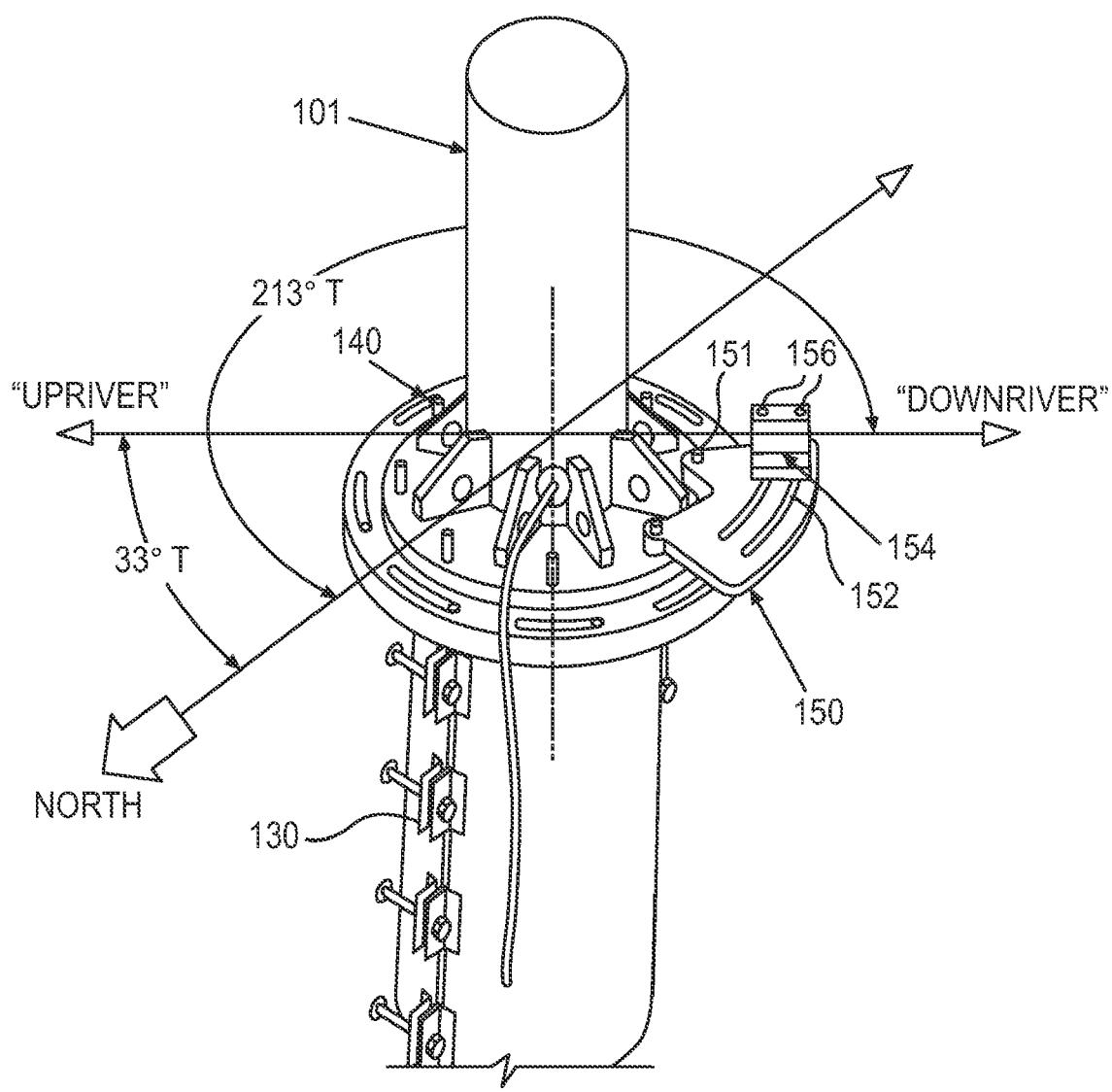
FIG. 3 is a partial elevational view of a portion of the turbine mounting structure and one embodiment of a turbine yaw stop arrangement.

A shaft 110 of the rotor 103 is rotatably coupled to the nacelle 104 through a dynamic shaft seal 106 that allows the shaft 110 to pass through seal 106 in a watertight manner to drive generator 108 without allowing water to leak into nacelle 104. The connection of shaft 110 to generator 108, or to any other driven component, can be accomplished through a variety of connections, such as, for example, a suitable gearbox assembly 114, by a direct drive mechanism, or by some combination of drive arrangements. Generator 108 creates electrical power that is transmitted or fed onto a power grid, or some other load, as is known in the art. Turbine 100 can be suitably coupled to an onshore control station (not shown) via power and control cables shown at 112 in FIGS. 1 and 2. The power and control cable 112 passes from within nacelle 104, where it is suitably sealed at its exit from nacelle 104 as shown in FIG. 2. Cable 112 can then pass downwardly through inner pylon 101 having passed through a strain relief assembly 113. Cable 112 can exit at a desired point below outer pylon 107, for example through an unsealed opening 115 as shown in FIG. 3, adjacent the bottom of inner pylon 101 and above the mounting plate 153 forming the base of the inner pylon 101. Cable 112 will then preferably enter onto or into the river bed 105 and then travel onto the shore and to a control station. In addition, the amount of cable 112 provided within inner pylon 101 is long enough so that it can accommodate motion but not be overly twisted as the nacelle 104 and the outer pylon 107 rotate. In order to limit the yaw rotation, yaw stops are employed. This permits the use of fixed power and control cables, eliminating the need for any slip rings or other device that would allow the turbine to turn indefinitely, but which is unnecessary in tidal flows and which would impose extra costs and a source of unreliability.

FIG. 2 shows a cutaway view of the outer pylon 107, with the portion that is cut away showing a portion of the interior of the outer pylon 107 and the location of the inner pylon 101 as well as the various bearings that permit relative rotation between the inner and outer pylons, 101 and 107, respectively. The inner pylon 101 includes a top plate 171 that is preferably welded or otherwise fixed thereto. The outer pylon 107 is comprised of a tubular member 180, designed to slip over inner pylon 101, upper and lower mounting flanges 160 and 161 and fairings 162 and 163. A cylindrical frame 173 depends from mounting plate 160 and a thrust bearing 170 can be mounted to a portion of the bottom of that frame 173. Tubular member 180 extends over the exterior of and around frame 173, as shown in FIG. 2, and when the outer pylon 107 is mounted on the inner pylon 101 thrust bearing 170 will rest upon the top of plate 171 at the top of the inner pylon 101. Cylindrical frame 173 could be welded to, otherwise mounted on or formed as a part of nacelle 104 or mounting flange 160. Tubular member 180 (outer pylon 107) can itself be welded to or otherwise fixed to mounting flange 160, which in turn, can be bolted or otherwise suitably fixed to the bottom of nacelle 104. The opposite and lower end of outer pylon 107 is comprised of the lower, horizontally extending mounting flange 153 that is also welded or otherwise fixed at the bottom of the tubular member 180. The inner pylon 101 and outer pylon 107 are both preferably formed from steel, but it should be understood that other materials or combinations of materials could be used in their construction. This includes, but is not limited to stainless steel, plastics, fiber-reinforced plastics foams and other man-made materials. The tubular member 180, and thus outer pylon 107, is supported vertically by thrust bearing 170 located between the top plate 171 and the cylindrical frame 173. Tubular member 180 will be supported radially by upper and lower bushings 166 and 168, respectively, shown in FIG. 2 which would be mounted to either the inner pylon 101 or the tubular member 108 and run against the other. Suitable bushing materials include, for example, but are not limited to Vesconite™, Thordon™, and various grades of acetal or "Delrin™." As an alternative to forming inner pylon 101 and tubular member 180 from steel, it should be understood that the exterior of the inner pylon 101 could be stainless steel or covered by a stainless steel sleeve (not shown), and that the interior of tubular member 180 could also include a stainless steel sleeve (not shown). In this way, the bushings 166 and 168 could run against a facing stainless steel sleeve. Further, it should also be understood that the yawing and rotation of nacelle 104 about inner pylon 101 occurs at a relatively slow speed and at a very low duty cycle, making the turning process and the assemblies permitting rotation to be both simple in construction and rugged in design.

Outer pylon 107 also includes an outer fairing structure comprised of fairing plates 162 and 163 that are attached, for example by being welded, between the horizontally extending mounting flange 160 and fairing bottom plate 161. Both fairing plates 162 and 163 extend vertically and define a vertically extending edge 165. The upstream vertical edges of fairing plates 162 and 163 are also connected along the exterior of the tubular member 180 as well as being welded together along edge 165 at their mating downstream edges. Such connections are preferably welded joints or seams, but any form of connection can be used, depending upon the material from which such parts are fabricated. The fairing plates 162 and 163 can be curved plates, as shown in cross section in FIG. 6, or could be flat plates. The fairing plates 162 and 163 when mounted in this manner will tend to eliminate vortices in the flow that would otherwise be shed by a cylindrical pylon shape, and promote a smooth flow entering the area of the rotor without the loss of energy that would accompany flow vortices. They will also contribute some yawing torque when at an angle to the flow. Thus, fairing plates 162 and 163 of the outer pylon 107 will also aid in causing the rotation of turbine 100 and assist in the orientation of turbine 100 within the current flow and damp sideways oscillations. It should be understood that the sides of outer pylon 107 formed by fairing plates 162 and 163 could be formed as a one piece structure and from material, such as, for example, one that could be molded or otherwise formed to obtain the desired exterior shape for outer pylon 107. That fairing assembly would then be suitably connected and secured to tubular member 180 and to nacelle 104.

The interior space between the inner and outer pylons, 101 and 107, respectively, is unsealed so that bearings 166 168 and 170 are all water wetted bearings and no lubrication will be required. Also, the area between the inner pylon 101 and outer pylon 107, that is the area between the stainless steel sleeves, can be open to water and thereby avoid seals to protect the bearing assemblies. It should be understood that all that is required is that there be relative rotation between the outer pylon 107 and the inner pylon 101, and that a variety of rotational mounting arrangements could be employed other than the bearings discussed above.

In the most basic case, turbine 100 would be completely self-sufficient, that is turbine 100 would simply generate power without needing to be controlled or monitored in any way. This would lower the cost of turbines 100 and the connections thereto, because electronic controls and monitoring components 109 could be eliminated from the system. Consequently, while turbine 100 as described herein, as possibly including various electronic controls and monitoring components 109, or other architectures of electronic controls and monitoring systems, those electronic controls and monitoring components 109 are exemplary and, depending on the generator topology, may be omitted in accordance with the present invention without departing from the spirit thereof.

To appreciate turbine movement and the corresponding yaw motion contemplated herein, one can begin with the ideal downstream turbine orientation as shown in FIG. 7. The water flow direction is shown by the arrow on the left side of the figure. The yaw axis 120 is shown at the center of pylon 107 and is the point about which nacelle 104 and the attached outer pylon 107 rotate. The rotor 103 is positioned downstream from the vertical yaw axis 120 and water flows around a nose cone and along the length of nacelle 104 toward rotor 103.

Two yaw stop approaches are contemplated herein to accommodate the bi-directional or multi-directional flows that can affect underwater turbines. In one embodiment, turbine rotation is controlled by two stops, where the rotational path is less than 180° and in another by a single stop member where the rotational path will be less than 360°. Limiting the yaw rotation in either manner allows for the fixed cabling as described above.

FIGS. 3-6 show one exemplary embodiment of a stop assembly 149 that is provided to control the rotational movement of the outer pylon and attached turbine using a single stop member. The stop assembly 149 is comprised of several parts, some being mounted on the turbine mounting structure itself while others are mounted on the rotating outer pylon 107

The exemplary yaw stop assembly 149 can include a yaw stop carrier 150 that can be bolted or otherwise fixed in place on mounting assembly 140 such as, for example, is shown in FIG. 3 where it is connected by bolts 151 to the main mounting plate 153 of the inner pylon 101. It should be understood that there can be several mounting arrangements that will position the yaw stop assembly so that the stop is correctly positioned to intercept the corresponding stop arm 157 on the outer pylon to stop rotation at a desired location. The yaw stop carrier 150 includes several curved slots 152 which permit the adjustable mounting of a fixed yaw stop 154 on yaw stop carrier 150, such as by bolts 156. It is preferred that the yaw stop carrier 150 be positioned as close as possible to be aligned with the flow direction of the water current, such as an upriver or downriver position as is indicated by the arrows in FIG. 3, or to the flow direction of flooding and ebbing flows in a tidal site.

Figure 4:
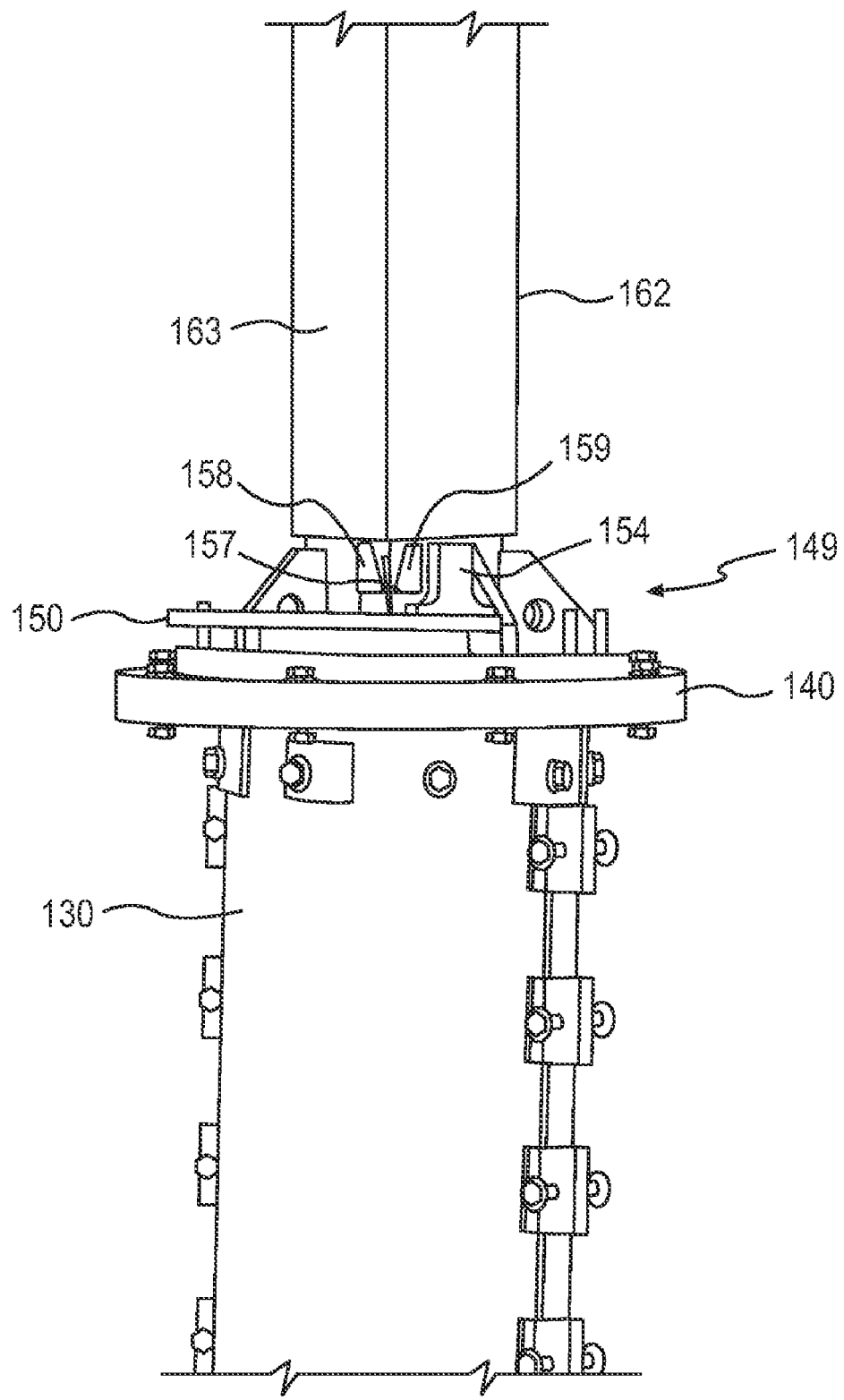
FIG. 4 is a partial perspective view of the mounting structure of FIG. 3 with a rotating pylon attached.
Figure 5:
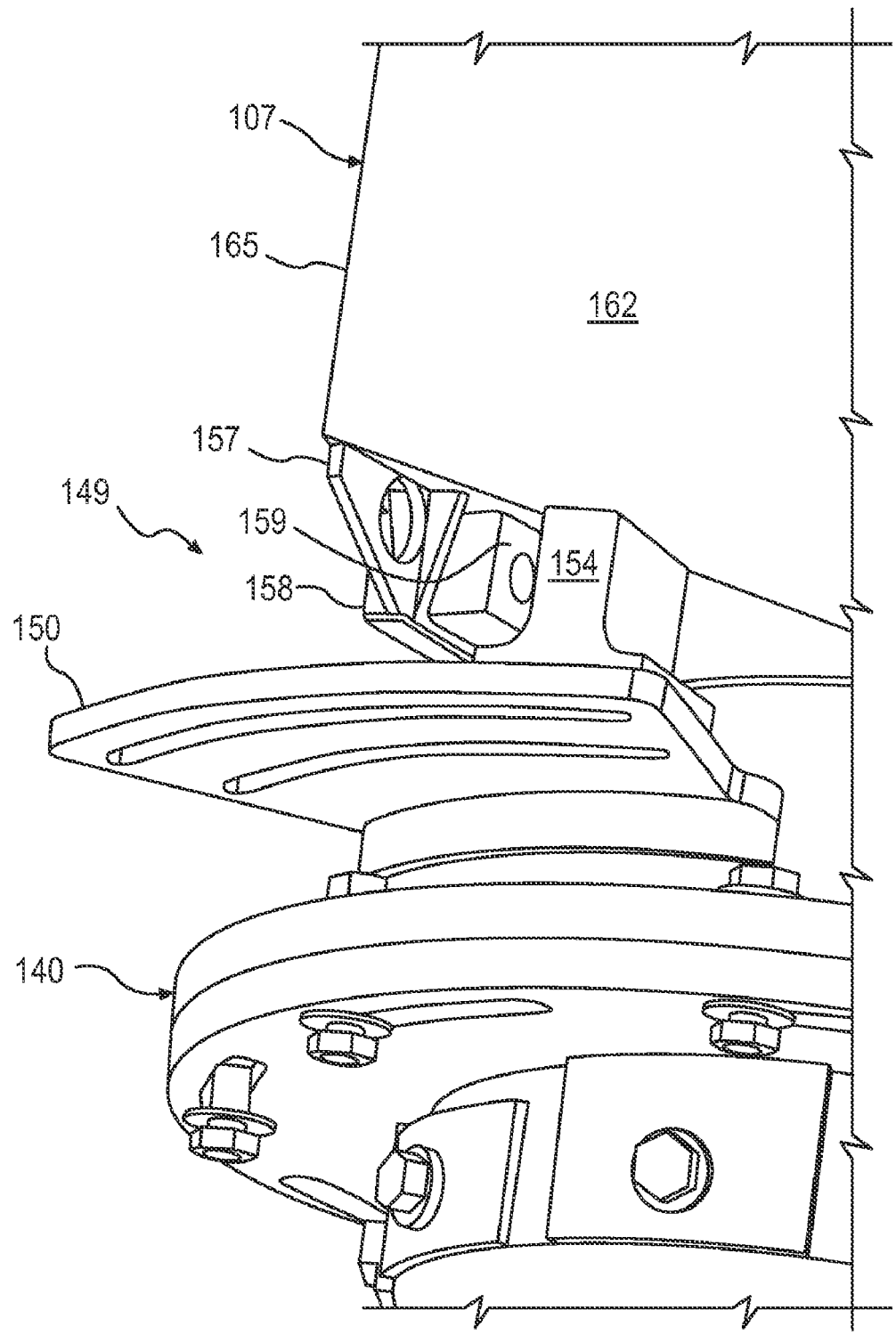
FIG. 5 is an enlarged partial view of the yaw stop embodiment of FIGS. 3 and 4.

As shown in FIGS. 4 and 5, the outer pylon 107 includes an outer pylon stop arm 157 that is bolted, welded or otherwise fixed, for example, to the bottom of the horizontally extending fairing bottom plate 161, discussed further below. Bumpers 158 and 159 are mounted on opposing sides of the outer pylon stop arm 157, respectively, and may be constructed or formed, such as by being molded, from rubber, plastic, or other suitable, water resistant material or a combination of materials, including but not limited to resilient materials, elastomeric devices including but not limited to springs, a block of elastomeric material, shock absorbers, and similar devices, in order to cushion any impact of the stopping action against the stop, and to reduce any shock loads. FIGS. 4 and 5 show bumper 159 being in contact with the fixed yaw stop 154. Should the outer pylon 107 rotate fully in a reverse or clockwise direction, looking at FIG. 6, for example, then bumper 158 will be in contact with the opposite side of the fixed yaw stop 154, as is shown by dotted lines. It should be kept in mind, that in practice where a single stop like fixed yaw stop 154 is being used, that stop member will actually be operative in only one of the operating directions as the turbine 100 will be held in the opposite flow direction by the force of the flowing stream and will be in a free yaw condition where the nacelle is able to swing or rotate freely in that orientation under the control or only the influence of the water flow itself.

As but one example of this movement, reference can be made again to FIG. 3. In this embodiment, the fixed yaw stop 154 is positioned so that when the water flow direction is "downriver," which can be the case about one half of the time, the stopped position for turbine 100 will be at an angle of 213° from true North. In that position bumper 159, as shown in FIG. 6, will be in contact with fixed yaw stop 154. However, when the water flow direction changes and becomes directed. "upriver," as is also identified in FIG. 3, the water flow direction will now be 33° from true North. The turbine 100 will have rotated in a clockwise direction away from fixed yaw stop 154 and turbine 100 will be held in that new upriver flow orientation by the flowing stream, not by any stop arrangement. Thus, with one fixed yaw stop, the position and orientation of turbine 100 can be controlled in a downriver type of water flow yet be able to be re-positioned into an upriver position by turning either in a clockwise or a counter clockwise direction, thus accommodating water flows in both directions and be in the optimal or near-optimal orientation to generate power in all such flows.

As noted above, FIG. 6 shows another view of this same embodiment, with one or the other of bumpers 158 and 159 being in contact with the fixed yaw stop 154 at two different positions, one in full line and another in dotted line, depending upon how turbine 100 moves in the current. If the water flow direction changes and moves from right to left, in FIG. 6, turbine 100 will be in a position substantially directly opposite that shown in FIG. 6 and in that position turbine 100 will be in a free flow state within the flowing stream environment.

It should be noted that fixed yaw stop 154 prevents turbine 100 from rotating exactly through a 360° arc. Rather, as shown in FIG. 6, the total yaw angle will be equal to 360° less the value of a yaw stop exclusion angle 167 that is defined as the angle formed between the two positions of trailing edge 165 of the outer pylon 107 or the angle where the turbine mechanically cannot be located. The yaw stop exclusion angle 167 can range, for example, from about 5° to about 20°, and is preferably about 15°, centered on the flow direction. Thus, the yaw angle will range between about 320° to about 350°. FIG. 6 also includes a yaw stop error angle 169 that is the angle between the ideal flow direction and the actual axis of the turbine nacelle or main rotor shaft, or the angle between the ultimate position of the turbine and the flow of water. If the stop is installed perfectly in line with the flow direction, the nacelle 104 will still be off by the yaw stop error angle. These yaw stop exclusion angles and yaw stop error angles are also shown in FIG. 8. Here, the yaw stop error angle 169 is about one half of the yaw stop exclusion angle 167. Thus, the yaw stop error angle 169 can, for example, range from about 2.5° to about 10°. This yaw stop error angle 169 assures that turbine 100 will remain slightly offset from a direct alignment with the direction of water flow so that the yaw rotation of turbine 100 will not be stuck, but rather will be more sensitive to flow changes between the two directions of flow and thus more likely to respond to flow changes whereby reversal is assured as the current flow direction reverses.

A second exemplary embodiment for controlling the rotational movement of turbine 100 is shown in FIG. 9. In this embodiment, two yaw stops 200 and 202 are provided on the mounting assembly 140 in a manner similar to that shown for stop 156 in FIG. 3. It should be understood that the turbine 100 could just as easily be positioned to engage the other side of stops 200 and 202 so that the movement, and the various angles, would be reversed from that shown here. Yaw stop 200 is positioned to stop rotation of the pylon 107 in a clockwise direction and orients turbine 100 and rotor 103 in the desired position for water flowing in the Dir. A as shown on the left side of FIG. 9. When the flow direction changes to Dir. B, shown on the right side of FIG. 9, turbine 100 will be rotated around its vertical yaw axis 120 and through a yaw angle of about 160°, depending upon the error angle 169, to the dotted line position shown on the left side of FIG. 9, with rotor 103 now facing the downstream flow in direction B. In each of the Dir. A and B flows, while turbine 100 could be stopped to be in direct alignment with one or both flow directions, it is preferred that rotational movement be almost, but not precisely aligned with either of the flow directions. Rather, it is preferred that the rotation of turbine 100 is stopped at a point where there remains a yaw stop error angle 169 that can range from about 5° to about 20°, or more preferably from about 2.5° to about 10°. This yaw stop error angle 169 assures that turbine 100 will remain slightly offset from a stopped position that would be in direct alignment with the water flow. This yaw stop error angle assures that rotation of turbine 100 will not be stuck in such a direct alignment position, but rather will be more sensitive to flow changes between the two directions of flow, Dir. A and Dir. B, and thus more likely to respond to flow changes whereby reversal is assured as the current flow direction reverses. In this second embodiment, the angle of yaw rotation will only be permitted within a range less than 180° or within a range of about 160° to about 175° depending upon the particular yaw stop error angles that are chosen for each direction. It should also be understood that the yaw stop error angle 169 need not be identical on each side of the yaw angle of rotation since the opposing flow direction may not be precisely 180 degrees apart. Thus, yaw error angle 169 could be, for example, 2.8° on one side and 7° on the other. Here, the yaw exclusion angle will be much larger, as it is that angle through which rotation is prevented, and it can range between about 185° to about 200° again depending upon precisely where stops 200 and 202 are positioned and the value determined for the yaw stop error angle 169.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

We claim:

1. A yaw stop arrangement for positioning a kinetic hydropower turbine relative to flowing fluid streams comprising:
   a mounting assembly including a fixed portion and a rotating portion rotatably mounted on the fixed portion so that the rotating portion can rotate through a defined yaw angle;
   a turbine connected to the rotating portion; and
   at least one stop assembly including a yaw stop carrier attached to the fixed portion and a yaw stop member positioned thereon within a rotational path of the rotating portion, the rotary portion including a pylon stop arm and including on opposing sides bumper members so that one side of the yaw stop carrier will be engaged by one of the bumper members on the rotating portion to thereby limit further movement of the rotating portion in one direction of rotation, and the other bumper member will be engaged by an opposite side of the yaw stop member as the rotating portion moves through the defined yaw angle to an opposite rotational direction so as to align the turbine with at least one flow direction of the flowing fluid.

2. The yaw stop arrangement as in claim 1 wherein yaw rotation of the turbine is stopped prior to being in direct alignment with fluid flow in at least one direction.

3. The yaw stop arrangement as in claim 1, wherein the location of said yaw stop member on said fixed portion is adjustable.

4. The yaw stop arrangement as in claim 1, wherein the yaw angle can vary between about 320° and about 350°.

5. The yaw stop arrangement as in claim 1, wherein the at least one stop assembly is positioned to include an offset from a fluid flow direction by a yaw stop exclusion angle.

6. The yaw stop arrangement as in claim 5, wherein the yaw stop exclusion angle that can very between about 5° to about 20°.

7. The yaw stop arrangement as in claim 5, wherein the yaw stop exclusion angle includes a yaw stop error angle.

8. The yaw stop arrangement as in claim 7, wherein the yaw stop error angle is equal to about one half the value of the yaw stop exclusion angle.

9. The yaw stop arrangement as in claim 7 wherein the yaw stop error angle can very between 2.5° and 10°.

10. The yaw stop arrangement as in claim 1, wherein the at least one stop assembly can be engaged by both clockwise and counterclockwise rotational movements of the rotating portion.

11. The yaw stop arrangement as in claim 1, wherein the bumper members each comprise a resilient stop member.

12. The yaw stop arrangement as in claim 1, further including a second stop assembly located at a position which is spaced circumferentially from said at least one stop assembly to limit rotation relative to a second flow direction to provide a yaw angle less than 180°.

13. The yaw stop arrangement as in claim 12, wherein said second stop member stops rotational movement of the rotating portion prior to the full alignment of the turbine with the second flow direction.

14. The yaw stop arrangement as in claim 12, wherein the yaw angle preferably varies between 160° and 175°.

15. The yaw stop arrangement as in claim 14, further including a yaw stop error angle that ranges from 2.5° to 10°.

16. The yaw stop arrangement as in claim 12, further including positioning each stop assembly at a location that defines a yaw stop error angle.

17. The yaw stop arrangement as in claim 1, wherein the turbine includes a horizontally extending nacelle to which a rotating rotor assembly is mounted adjacent one end thereof, and the rotating portion includes a vertically extending tubular support member rotatably mounted to the fixed portion, and fairing plates mounted to and extending from opposite sides of the tubular member to form a unitary downstream edge.

18. The yaw stop arrangement as in claim 17 further including a series of spaced apart bearings positioned between the rotating and fixed portions.

19. The yaw stop arrangement as in claim 1, wherein the rotation of the turbine is controlled so that when stopped the ideal position of the turbine is offset from an actual flow direction of the fluid stream.

* * * * *